United States Patent
Onuma et al.

(10) Patent No.: US 10,315,515 B2
(45) Date of Patent: Jun. 11, 2019

(54) POWER TRANSFER UNIT PINION SHAFT AND PROPELLER SHAFT COUPLING MEMBER FOR A VEHICLE, AND METHODS OF USE AND MANUFACTURE THEREOF

(71) Applicant: Honda Motor Co., Ltd., Tokyo (JP)

(72) Inventors: Yasushi Onuma, Dublin, OH (US); Shintaro Yokota, Powell, OH (US); Matthew R. Scott, Marysville, OH (US); William J. Clark, Westerville, OH (US); Christa S Banks, Columbus, OH (US); Takahiro Nozaki, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 333 days.

(21) Appl. No.: 15/230,286

(22) Filed: Aug. 5, 2016

(65) Prior Publication Data

US 2018/0037109 A1 Feb. 8, 2018

(51) Int. Cl.
| B60K 17/344 | (2006.01) |
| F16H 1/22 | (2006.01) |
| F16H 57/038 | (2012.01) |
| F16D 1/10 | (2006.01) |
| F16D 1/104 | (2006.01) |

(Continued)

(52) U.S. Cl.
CPC ............ *B60K 17/344* (2013.01); *B60K 17/22* (2013.01); *B60K 17/24* (2013.01); *F16D 1/10* (2013.01); *F16D 1/104* (2013.01); *F16D 1/116* (2013.01); *F16H 1/222* (2013.01); *F16H 57/0025* (2013.01); *F16H 57/021* (2013.01);

(Continued)

(58) Field of Classification Search
CPC ..... B60K 17/344; F16H 1/222; F16H 57/038; F16D 2001/103
USPC ............................................. 74/665 F
See application file for complete search history.

(56) References Cited

U.S. PATENT DOCUMENTS

| 1,434,697 A | 11/1922 | Heisler |
| 2,693,244 A * | 11/1954 | Rockwell ............... B60K 17/36 |
| | | 180/24.09 |

(Continued)

FOREIGN PATENT DOCUMENTS

| CN | 103158883 A | 6/2013 |
| CN | 204592074 U | 8/2015 |

(Continued)

*Primary Examiner* — Ha Dinh Ho
(74) *Attorney, Agent, or Firm* — Kenealy Vaidya LLP

(57) ABSTRACT

Some embodiments are directed to a pinion shaft assembly of a power transfer unit for transferring torque from an output gear of a transmission to a driveline structure of a vehicle. The embodiments include a hollow shaft that includes an internal splined portion, a pinion gear connected to a first end of the hollow shaft, and a coupling member that includes a flange and a coupling extension extending from the flange. The coupling extension includes an external splined portion at a first end such that the coupling extension mounts coaxially within the hollow shaft. The internal splined portion of the hollow shaft meshes with the external spline portion of the coupling extension in a spline connection for coupled rotation of the hollow shaft and the coupling extension, and the flange is disposed external to the hollow shaft and configured to be connected to the driveline structure.

20 Claims, 6 Drawing Sheets

(51) Int. Cl.
  *F16D 1/116* (2006.01)
  *F16H 57/00* (2012.01)
  *F16H 57/021* (2012.01)
  *B60K 17/22* (2006.01)
  *B60K 17/24* (2006.01)
  *F16H 48/42* (2012.01)
  *B60K 5/04* (2006.01)

(52) U.S. Cl.
  CPC .............. *F16H 57/038* (2013.01); *B60K 5/04* (2013.01); *F16D 2001/103* (2013.01); *F16H 2048/423* (2013.01)

(56) References Cited

U.S. PATENT DOCUMENTS

| | | | |
|---|---|---|---|
| 2,699,075 A | 1/1955 | Buckendale | |
| 3,887,037 A * | 6/1975 | Haluda | F16H 57/0421 184/6.12 |
| 4,802,383 A | 2/1989 | Katayama et al. | |
| 4,829,850 A | 5/1989 | Soloy | |
| 6,425,840 B1 * | 7/2002 | Johansson | B60K 17/16 475/223 |
| 6,478,132 B1 | 11/2002 | Inaba | |
| 6,648,788 B1 * | 11/2003 | Sullivan | B60K 17/16 180/24.09 |
| 7,500,934 B2 * | 3/2009 | Ziech | B60K 17/36 475/221 |
| 2014/0349802 A1 | 11/2014 | Steiner et al. | |

FOREIGN PATENT DOCUMENTS

| | | |
|---|---|---|
| EP | 2267337 A2 | 12/2010 |
| JP | H10103454 A | 4/1998 |
| WO | 2011150619 A1 | 12/2011 |

* cited by examiner

POWER TRANSFER UNIT PINION SHAFT AND PROPELLER SHAFT COUPLING MEMBER FOR A VEHICLE, AND METHODS OF USE AND MANUFACTURE THEREOF

BACKGROUND

The disclosed subject matter relates to a power transfer unit pinion shaft and propeller shaft coupling member for a vehicle, as well as methods of use and manufacture thereof. More particularly, the disclosed subject matter relates to a pinion shaft assembly that can provide torque to a driveline structure of a vehicle, such as a four-wheel drive or an all-wheel drive vehicle.

It can be beneficial to provide drive torque to a driveline structure of a vehicle, such as to rear wheels of a four-wheel drive vehicle using a power transfer unit (PTU) that is driven by the output of a front-wheel drive transaxle. Some vehicle transmissions deliver torque through a power transfer gear to a pinion gear. A pinion shaft can connect to the pinion gear and deliver torque to the propeller shaft, which transfers torque to the rear driveline structure.

SUMMARY

During the vehicle operation, torsional stresses can occur in the driveline structure that can be caused by variation of the driving torque. Such torsional stresses can induce driveline torsional vibrations and lateral vibrations, which can have detrimental effects on various aspects of the vehicle. For example, torsional and lateral vibrations can be responsible for power losses between an engine and a final drive structure. Torsional and lateral vibrations can also induce objectionable noise in the propeller shaft during vehicle operation as well as cause excessive wear on components of the driveline structure, which can negatively affect the efficiency and life of the components.

Packaging the PTU and the remaining driveline components within the vehicle underbody can be an important vehicle design consideration. It may be beneficial to provide powertrain arrangements that are compact in size, can be packaged into existing vehicles, and provide features (i.e., full-time all-wheel drive, automatic four-wheel drive, etc.) that enhance vehicle performance.

A solid pinion shaft can connect to a short companion flange that can spline onto the end of the pinion shaft and be retained by a nut. Such designs can suffer disadvantages, such as occupying extraneous axial length, requiring either the total system to be longer, or for the span between pinion shaft support bearings to be narrower. Thus, it may be beneficial to address at least one of the issues identified above.

In addition, it may be beneficial or necessary in the context of a vehicle to provide a shorter overall length of the pinion shaft with a wider span between pinion shaft support bearings, but that can be sized to still support the vehicle driveline and transfer torque to the driveline structure. It may be beneficial to provide layout advantages of occupying less space within the PTU, as well as reducing noise, vibration, and harshness (NVH) within a vehicle.

Some embodiments are therefore directed to a pinion shaft assembly of a power transfer unit for transferring torque from an output gear of a transmission to a driveline structure of a vehicle. These embodiments can include a hollow shaft that includes an internal splined portion, a pinion gear connected to a first end of the hollow shaft, and a coupling member that includes a flange and a coupling extension extending from the flange. The coupling extension includes an external splined portion at a first end such that the coupling extension mounts coaxially within the hollow shaft. The internal splined portion of the hollow shaft meshes with the external spline portion of the coupling extension in a spline connection for coupled rotation of the hollow shaft and the coupling extension, and the flange is disposed external to the hollow shaft and configured to be connected to the driveline structure.

Other embodiments can be directed to a power transfer unit for a vehicle transferring torque from an input gear of a transmission to a driveline structure of the vehicle that includes an input gear, a power transfer shaft, connected to and driven by the input gear, and a crown gear connected to and driven by the power transfer shaft, where the input gear and the crown gear are fixed for rotation with the power transfer shaft. These embodiments can also include a pinion gear connected to and driven by the crown gear, and a pinion shaft assembly connected to and driven by the output gear. The pinion shaft assembly includes a hollow shaft that includes an internal splined portion, a pinion gear connected to a first end of the hollow shaft, and a coupling member that includes a flange and a coupling extension extending from the flange. The coupling extension includes an external splined portion at a first end such that the coupling extension mounts coaxially within the hollow shaft. The internal splined portion of the hollow shaft meshes with the external spline portion of the coupling extension in a spline connection for coupled rotation of the hollow shaft and the coupling extension, and the flange is disposed external to the hollow shaft and configured to be connected to the driveline structure.

Still other embodiments can be directed to a method for transferring torque from an output gear of a transmission to a driveline structure of a vehicle. This method can include splining an internal portion of a hollow shaft, connecting a pinion gear to a first end of the hollow shaft, and splining an external portion of a first end of a coupling extension of a coupling member that includes a flange at a second end. The method can also include coaxially mounting the extension member within the hollow shaft, meshing the external splined portion with the internal splined portion in a spline connection for coupled rotation of the hollow shaft and the coupling extension, and configuring the flange to be connected to the driveline structure of the vehicle.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Vehicle Powertrain

Figure 1:
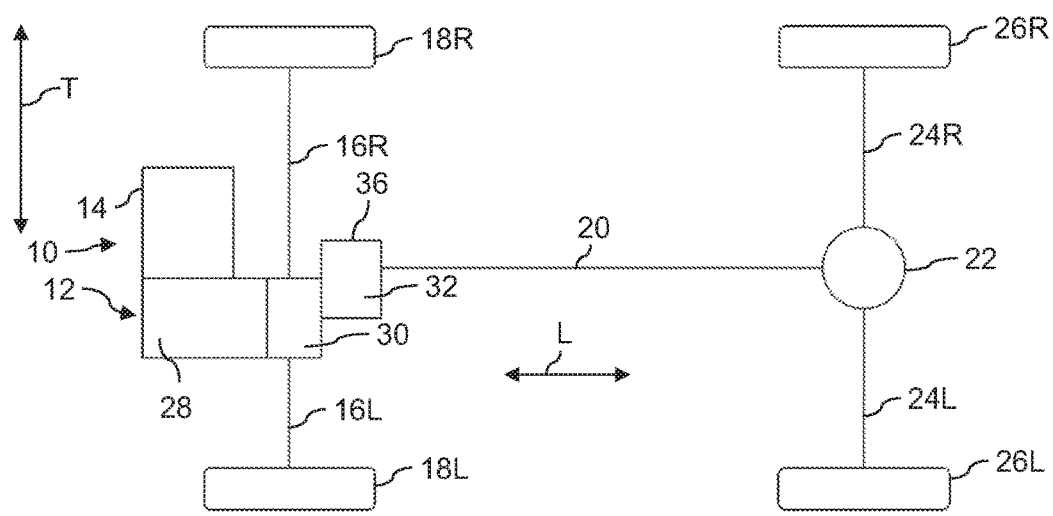
FIG. 1 is a schematic view of a powertrain of a vehicle made in accordance with principles of the disclosed subject matter.

FIG. 1 is a schematic view of a powertrain of a vehicle 10 made in accordance with principles of the disclosed subject matter. The powertrain of the vehicle 10 can include an embodiment of a transaxle 12 in accordance with principles of the disclosed subject matter. The vehicle 10 can be configured as, but is not limited to, a four-wheel drive vehicle or an all-wheel drive vehicle. The vehicle 10 can also include a power source, such as an internal combustion engine 14, a pair of front driveshafts 16L, 16R, a pair of front wheels 18L, 18R, a propeller shaft 20, a rear differential assembly 22, a pair of rear driveshafts 24L, 24R, and a pair of rear wheels 26L, 26R.

Each of the driveshafts 16L, 16R, 24L, 24R can extend in a transverse direction (indicated by arrows T) of the vehicle 10. The rear driveshafts 24L, 24R can be spaced from the front driveshafts 16L, 16R in a longitudinal direction (indicated by arrows L) of the vehicle 10, which is perpendicular to the transverse direction T. Each of the front driveshafts 16L, 16R can be connected to and driven by the transaxle 12. Each of the rear driveshafts 24L, 24R can be connected to and driven by the rear differential 22.

The left front wheel 18L can be connected to and driven by the left front driveshaft 16L. The right front wheel 18R can be connected to, and driven by, the right front driveshaft 16R. The left rear wheel 26L can be connected to, and driven by the left rear driveshaft 24L, and the right rear wheel 26R can be connected to, and driven by, the right rear driveshaft 24R.

Each of the internal combustion engine 14 and the transaxle 12 can be oriented with their output shafts (not shown) in the transverse direction T of the vehicle 10. The internal combustion engine 14 can be connected to the transaxle 12 to drive the transaxle 12.

The propeller shaft 20 can extend in the longitudinal direction L of the vehicle 10 such that the propeller shaft 20 can connect to each of the transaxle 12 and the rear differential assembly 22. The propeller shaft 20 can be driven by the transaxle 12 using appropriate gear assemblies and can drive the rear differential assembly 22.

The transaxle 12 can include a multi-ratio transmission 28 and a power transfer unit 32. The transaxle 12 can be configured such that it is accommodated within the engine compartment (not shown) of the vehicle 10.

Figure 2:
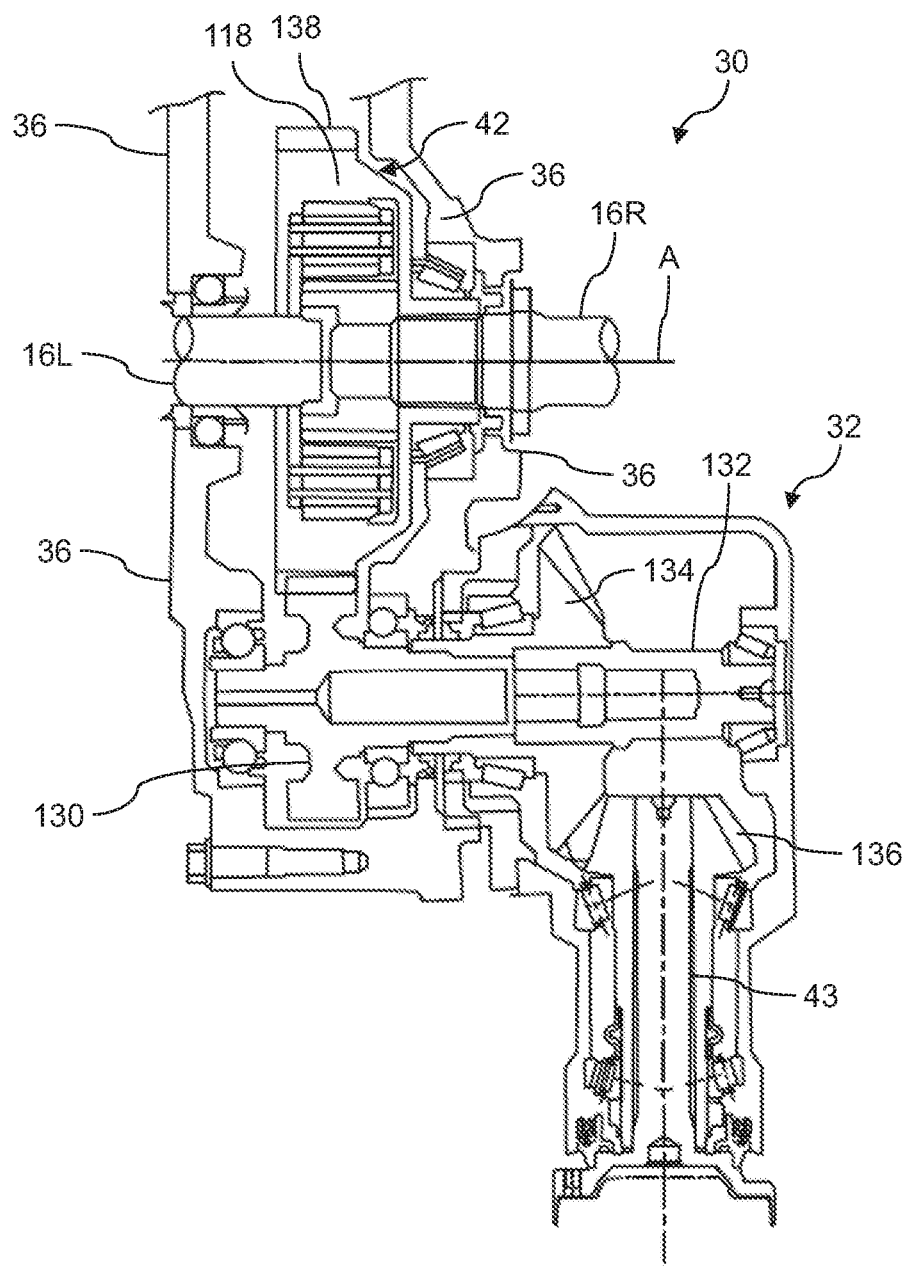
FIG. 2 is a cross-sectional view of a power transfer unit of the powertrain of FIG. 1.

The multi-ratio transmission 28 can be connected to and driven by the internal combustion engine 14 using appropriate gear assemblies. The multi-ratio transmission 28 can include a plurality of drive ratios and an output gear (not shown). FIG. 2 is a cross-sectional view of the power transfer unit of the powertrain of FIG. 1. The power transfer unit 32 can be connected to an output gear of the multi-ratio transmission 28 that can be driven at an output speed that is a function of the speed of the internal combustion engine 14 and the selected one of the drive ratios. The multi-ratio transmission 28 can include a discrete number of forward drive ratios and a reverse drive ratio, which can be selected manually by an operator of the vehicle 10 or automatically.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission 28 can also include a reverse drive ratio.

The transaxle 12 can include a power transfer unit (PTU) case 36, in which components of the multi-ratio transmission 28 are mounted, as is known in the art. The PTU case 36 can also contain a two-speed final drive assembly 30 and the power transfer unit 32.

An output gear of the multi-ratio transmission 28 can drive a front differential assembly 42. The left front driveshaft 16L can be connected to and driven by the front differential assembly 42. The right front driveshaft 16R can also be connected to and driven by the front differential assembly 42. The front differential assembly 42 can permit the front driveshafts 16L, 16R to rotate relative to each other.

Although not illustrated in detail, the rear differential assembly 22 can be similar in construction to the front differential assembly 42. Additionally, the rear differential assembly 22 and/or the front differential assembly 42 can be any differential assembly for a vehicle, such as, but not limited to, an open-type differential, a limited slip differential, a viscous coupling-type differential, an electromagnetic clutch-type differential, etc.

When the vehicle 10 is configured as a four-wheel drive vehicle, or an all-wheel drive vehicle, the PTU case 36 can also contain the power transfer unit 32. The power transfer unit 32 can drive the propeller shaft 20. The power transfer unit 32 can include an input gear 130, a power transfer shaft 132, a crown gear 134, and an output gear 136 that includes output gear teeth 56. The output gear 136 can include, but is not limited to, a pinion gear. Each of the input gear 130 and the crown gear 134 can be fixed for rotation with the power transfer shaft 132. The power transfer shaft 132 can extend parallel to the axis A of the front driveshafts 16L,R. The output gear 136 can be driven by the crown gear 134 and can be fixed for rotation to the propeller shaft 20 as described more fully below.

An input member 118 to the front differential assembly 42 can also include a power transfer gear 138 that can engage and drive the input gear 130. As a result, the power transfer gear 138 can also drive the power transfer unit 32 at the selected one of a high range final drive ratio and a low range final drive ratio, and by extension, the rear wheels 26L, 26R can be driven based on the selected one of the high range final drive ratio and the low range final drive ratio. In an alternative embodiment, the power transfer gear 138 can be integrally formed with the input member 118 to provide a single, homogenous component.

II. Pinion Shaft Assembly

Figure 3:
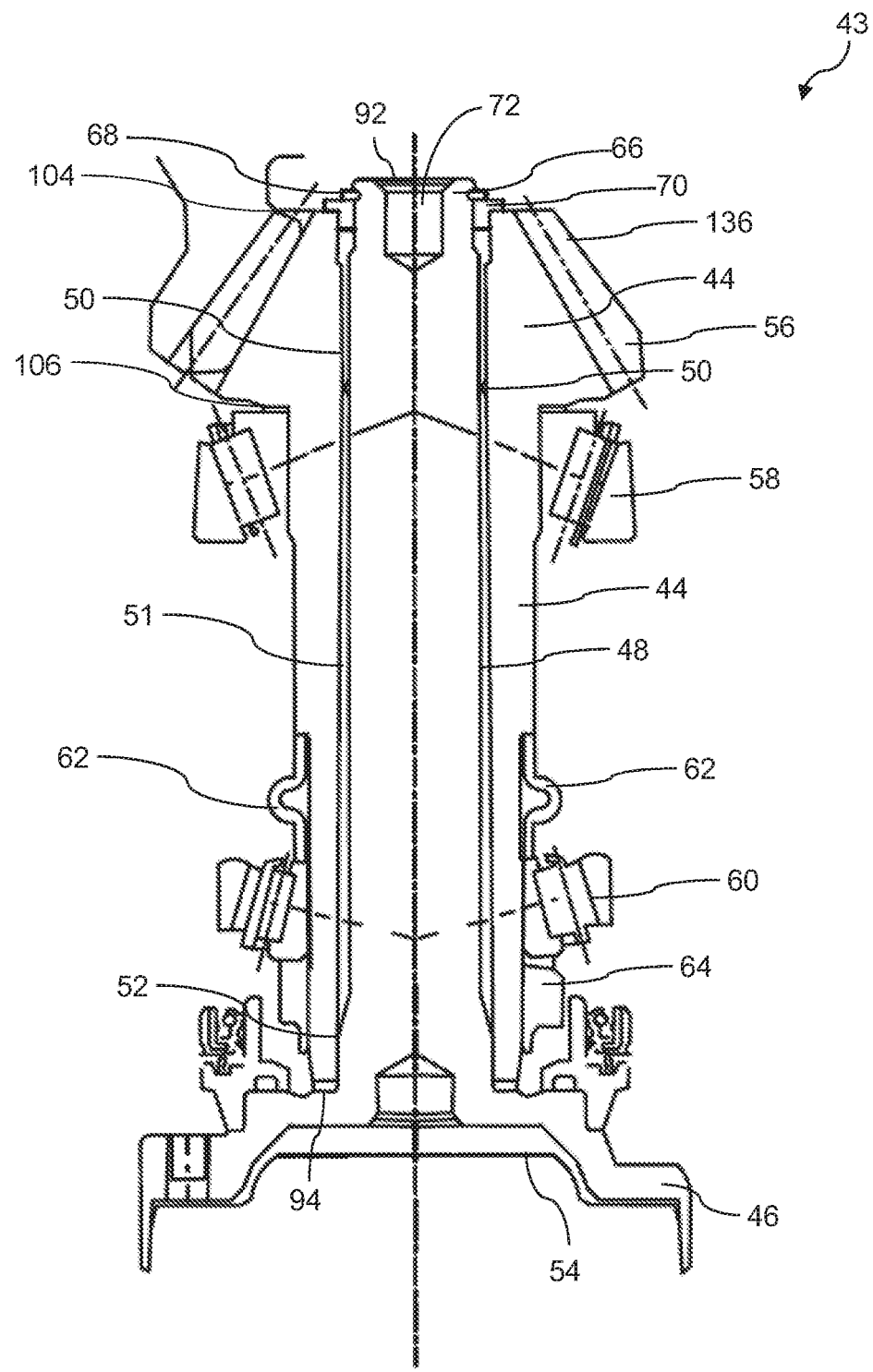
FIG. 3 is a cross-sectional view of an embodiment for a pinion shaft assembly of the power transfer unit of FIG. 2.

FIG. 3 is a cross-sectional view of an embodiment for a pinion shaft assembly 43 of the power transfer unit 32 of FIG. 2. The pinion shaft assembly 43 can include the output gear 136, a hollow shaft 44 and a coupling member 46. The embodiments are intended to include the output gear 136 that can be formed separately from the hollow shaft 44, and subsequently connected to the hollow shaft 44. In other embodiments, the output gear 136 can be integrated with the hollow shaft 44 to form a single member. The output gear 136 can include a first end 104 of the output gear 136 aligned with a first end 92 of the hollow shaft 44 and a second end 106 of the output gear 136 that can be spaced inwardly of the first end 92 of the hollow shaft 44. The output gear 136 can span an axial length from the first end 104 of the output gear 136 and the second end 106 of the output gear 136. The pinion shaft assembly 43 can be connected to the crown gear 134 and connected to the propeller shaft 20.

In an embodiment, the hollow shaft 44 can be an elongated cylindrical member that can extend from the first end 92 axially through, the output gear 136 to a second end 94. The coupling member 46 can be formed as a single member that can include a flange 54 and a coupling extension 48. The coupling extension 48 can be an elongated shaft that is coaxially mounted, or disposed within, and fixed for rotation with the hollow shaft 44 around a longitudinal axis of the pinion shaft assembly 43. For clarity of the disclosure, references to the first end 92 and the second end 94 can refer to opposing ends of either the hollow shaft 44, the coupling extension 48, or the pinion shaft assembly 43.

In an embodiment, an inner side of the hollow shaft 44 can be splined to an outer surface of the coupling extension 48 in a spline connection 50 that is disposed along at least a partial length of the hollow shaft 44. The spline connection 50 can extend along a partial length of the pinion shaft assembly 43 coincident with the output gear 136. An annular space 51 can define an area between the coupling extension 48 and the hollow shaft 44 without the spline connection 50.

The hollow shaft 44 and the coupling member 46 can rotate with the output gear 136. The crown gear 134 and the output gear 136 can mesh to transfer torque from the power transfer shaft 132 into the flange 54. The pinion shaft assembly 43 can be connected to the crown gear 134 and connected to the propeller shaft 20. The flange 54 can include attachments for coupling to the propeller shaft 20 in any appropriate configuration including, but not limited to, a yoke for a universal joint, a torsional vibration damper, etc.

To assemble the pinion shaft assembly 43, the coupling extension 48 of the coupling member 46 can be inserted into the hollow shaft 44 such that the spline connection 50 between the two pieces properly interlocks. The hollow shaft 44 can seat against the flange 54 at the second end 94, and the two pieces should obtain proper axial alignment.

In one embodiment, the coupling extension 48 can include an external piloting surface 52 that can be formed as an expanding bevel around the coupling extension 48. The external piloting surface 52 can have an external diameter approximate to an inner diameter 96 of the hollow shaft 44 and can axially align the hollow shaft 44 and the coupling extension 48 as the coupling extension 48 is inserted and seated into the hollow shaft 44. Alternatively, the hollow shaft 44 can be mounted onto the coupling extension 48.

The spline connection 50 provides a rotationally stiff connection between the coupling extension 48 and the hollow shaft 44 at the first end 92 of the pinion shaft assembly 43. In an embodiment, the spline connection 50 can be disposed within the first end 92 of the pinion shaft assembly 43 such that the spline connection 50 is defined within the extremities of the output gear 136. The spline connection 50 can terminate at the first end 104 of the output gear 136 and the second end 106 of the output gear 136, and provides a rotatably fixed end of the pinion shaft assembly 43. In the embodiment, the coupling extension 48 can extend beyond the first end 104 of the output gear 136 by a distance greater than the axial length of the output gear 136. In contrast, the second end 94 of the hollow shaft 44 and the piloting surface 52 at the second end 94 of the coupling extension 48 can rotate relative to one another. The distance between the splined connection 50 and the flange 54 can be set at a predetermined value such that the coupling extension 48 becomes elongated and the second end 94 of the coupling extension 48 can twist relative to the first end 92 of the coupling extension 48. In such a configuration, torsional vibrations applied to the second end 94 of the coupling extension 48 can result in twisting of the coupling extension 48. Torsional vibrations can be transferred to the coupling extension 48 by either or both of the output gear 136 and the propeller shaft 20. This twisting of the coupling extension 48 along its length can provide a dampening effect of the torsional vibrations transmitted to the coupling extension 48.

The pinion shaft assembly 43 can be rotatably supported by one or more pinion shaft assembly bearings. In an embodiment, a first bearing 58 and a second bearing 60 are positioned between the output gear 136 and the flange 54. The first bearing 58 can abut the output gear 136 and the second bearing 60 can be supported near the flange 54. However, the embodiments intend to include any disposition of the first bearing 58 and second bearing 60 along the length of the hollow shaft 44. In some embodiments, the first and second bearings 58, 60 can include, but are not limited to, single tapered roller bearings that can be of the same size or different sizes. The first bearing 58 can mount to the hollow shaft 44 in any appropriate manner, such as the inner race assembly press fit to the hollow shaft 44, and the outer race assembly press fit to the PTU case 36. The second bearing 60 can mount to the hollow shaft 44 in any appropriate manner including, for example, the inner race assembly press fit to the hollow shaft 44 and the outer race assembly press fit to the PTU case 36. The second bearing 60 can be disposed between at least one spacer 62 and a nut and shim 64. The nut and shim 64 can abut the flange 54. The spacer 62 can set the location of the second bearing 60 and resist the compressive force of the nut and shim 64. The nut and shim 64 can compress the second bearing 60 and can retain the hollow shaft 44 inside the PTU case 36.

Figure 4:
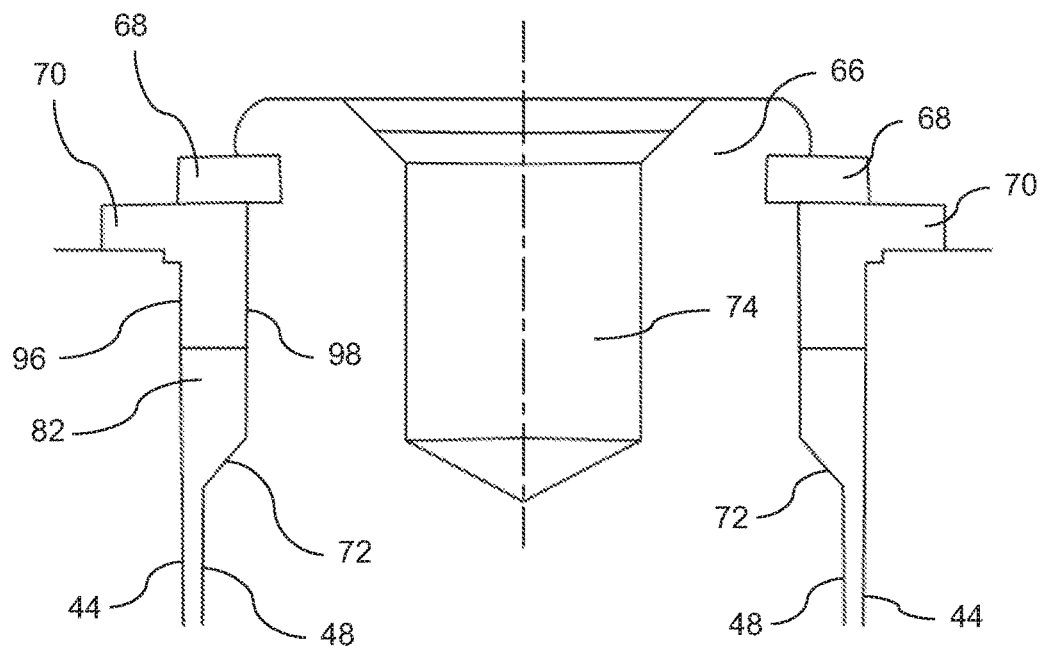
FIG. 4 is an enlarged view of a portion of FIG. 3.

FIG. 4 is an enlarged view of a portion of FIG. 3. In an embodiment, the coupling extension 48 can be retained inside the hollow shaft 44 in any appropriate manner such as, but not limited to, mechanical fasteners, welding, adhesive, friction fit, etc. The coupling extension 48 can include a reducing bevel 72 that reduces a diameter of the coupling extension 48 to a reduced coupling extension portion 66 that can extend beyond the shaft 44. An annular shim 70 can be coaxially disposed around the coupling extension portion 66 between the inner diameter 96 of the hollow shaft 44 and an outer diameter 98 of the coupling extension portion 66. One end of the shim 70 can extend towards the bevel 72 and an opposite end overhang an edge of the hollow shaft 44. The shim 70 can be held in place by a circlip 68 or any appropriate fastener including, but not limited to, mechanical fasteners, welding, adhesive, friction fit, etc. Thus, the circlip 68 and the shim 70 can removably retain the coupling member 46 inside the hollow shaft 44.

Figure 5:
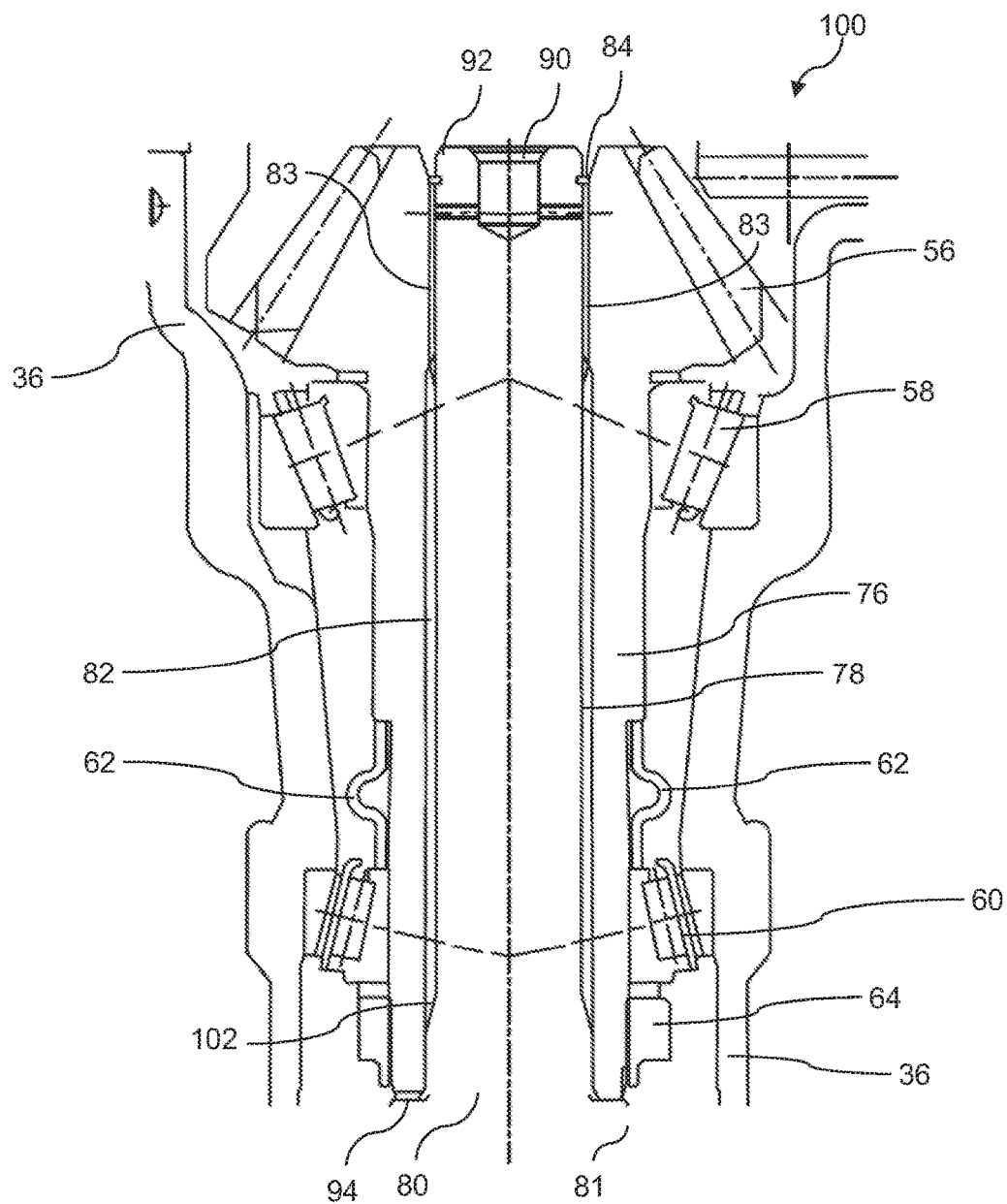
FIG. 5 is a cross-sectional view of an alternative embodiment of a pinion shaft assembly.

FIG. 5 is a cross-sectional view of an alternative embodiment of a pinion shaft assembly 100. The pinion shaft assembly 100 can include the output gear 136, a hollow shaft 76 and a coupling member 80. In some embodiments, the output gear 136 can include, but is not limited to, a pinion gear. Embodiments are intended to include the output gear 136 that can be formed separately from the hollow shaft 76, and subsequently connected to the hollow shaft 76. In other embodiments, the output gear 136 can be integrated with the hollow shaft 76 to form a single member. The hollow shaft 76 can be an elongated cylindrical member that can extend from the first end 92 axially through the output gear 136 to the second end 94. The coupling member 80 can be formed as a single member that can include a flange 81 and a coupling extension 78. The coupling extension 78 can be an elongated shaft that is coaxially disposed within and fixed for rotation with the hollow shaft 76 around a longitudinal axis of the pinion shaft assembly 100. For clarity of the disclosure, references to the first end 92 and the second end 94 can refer to opposing ends of either the hollow shaft 76, the coupling extension 78, or the pinion shaft assembly 100.

In an embodiment, an inner side of the hollow shaft 76 can be splined to an outer surface of the coupling extension 78 in a spline connection 83 that is disposed along at least a partial length of the hollow shaft 76. In an embodiment, the spline connection 83 can extend along a partial length of the pinion shaft assembly 100 coincident with the output gear 136. An annular space 82 can define an area between the coupling extension 78 and the hollow shaft 76 without the spline connection 83. The hollow shaft 76 and the coupling member 80 can rotate with the output gear 136. The output gear 136 can be driven by the crown gear 134 and can be fixed for rotation to the propeller shaft 20 as described more fully below.

The flange 81 can include attachments for coupling to the propeller shaft 20 in any appropriate configuration including, but not limited to, a yoke for a universal joint, a torsional vibration damper, etc.

To assemble the pinion shaft assembly 100, the coupling extension 78 of the coupling member 80 can be inserted into the hollow shaft 76 such that the spline connection 83 between the two pieces properly interlocks. The hollow shaft 76 can seat against the flange 81 at the second end 94, and the two pieces should obtain proper axial alignment. In one embodiment, the coupling extension 78 can include an external piloting surface 102 that can be formed as an expanding bevel around the coupling extension 78. The external piloting surface 102 can have an external diameter approximate to an inner diameter of the coupling extension 78, and can axially align the hollow shaft 76 and the coupling extension 78 as the coupling extension 78 is inserted and seated into the hollow shaft 76. Alternatively, the hollow shaft 76 can be mounted onto the coupling extension 78.

The spline connection 83 provides a rotationally stiff connection between the coupling extension 78 and the hollow shaft 76 at the first end 92 of the pinion shaft assembly 100. In an embodiment, the spline connection 83 can be disposed within the first end 92 of the pinion shaft assembly 100 such that the spline connection 83 is defined within the extremities of the output gear 136. The spline connection 83 can terminate at the first end 104 of the output gear 136 and the second end 106 of the output gear 136, and provides a rotatably fixed end of the pinion shaft assembly 100. In the embodiment, the coupling extension 78 can extend beyond the first end 104 of the output gear 136 by a distance greater than the axial length of the output gear 136. In contrast, the second end 94 of the hollow shaft 76 and the piloting surface 102 at the second end 94 of the coupling extension 78 can rotate relative to one another. The distance between the splined connection 83 and the flange 81 can be set at a predetermined value such that the coupling extension 78 becomes elongated and the second end 94 of the coupling extension 78 can twist relative to the first end 92 of the coupling extension 78. In such a configuration, torsional vibrations applied to the second end 94 of the coupling extension 78 can result in twisting of the coupling extension 78. Torsional vibrations can be transferred to the coupling extension 78 by either or both of the output gear 136 and the propeller shaft 20. This twisting of the coupling extension 78 along its length can provide a dampening effect of the torsional vibrations transmitted to the coupling extension 78.

The pinion shaft assembly 100 can be rotatably supported by one or more pinion shaft assembly bearings. In an embodiment, the first bearing 58 and the second bearing 60 are positioned between the output gear 136 and the flange 81. The first bearing 58 can abut the output gear 136 and the second bearing 60 can be supported near the flange 81. However, the embodiments intend to include any disposition of the first bearing 58 and second bearing 60 along the length of the hollow shaft 76. In some embodiments, the first and second bearings 58, 60 can include single tapered roller bearings that can be of the same size or different sizes. The first bearing 58 can mount to the hollow shaft 76 in any appropriate manner including, for example, the inner race assembly press fit to the hollow shaft 76, and the outer race assembly press fit to the PTU case 36. The second bearing 60 can mount to the hollow shaft 76, in any appropriate manner such as the inner race assembly press fit to the hollow shaft 76 and the outer race assembly press fit to the PTU case 36. The second bearing 60 can be disposed between the at least one spacer 62 and the nut and shim 64. The nut and shim 64 can abut the flange 81. The spacer 62 can set the location of the second bearing 60 and resist the compressive force of the nut and shim 64. The nut and shim 64 can compress the second bearing 60 and can retain the hollow shaft 44 inside the PTU case 36.

Figure 6:
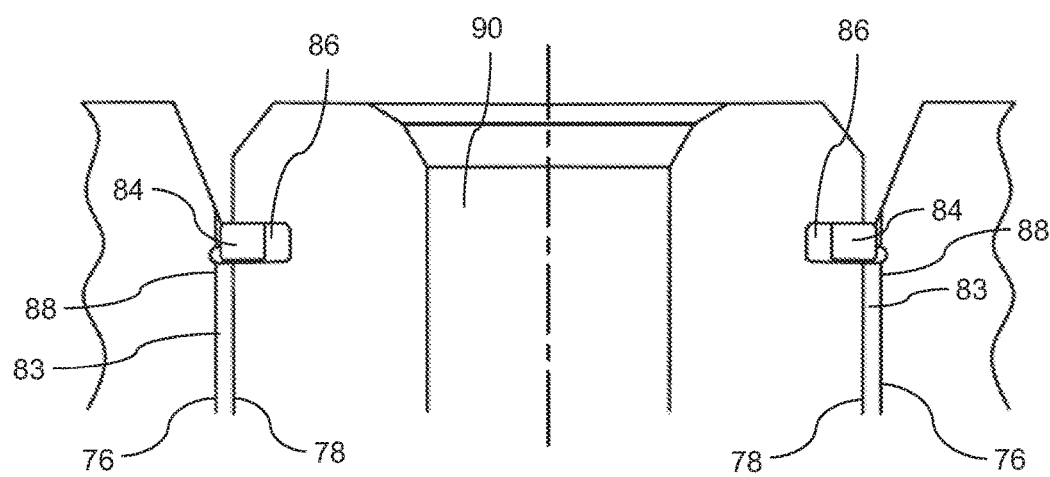
FIG. 6 is an enlarged view of a portion of FIG. 5.

FIG. 6 is an enlarged view of a portion of FIG. 5 and shows the coupling extension 78 extending axially through the hollow shaft 76, which is splined together with spline connection 83. A receiver 90 can receive other gears, shafts, members, etc. The coupling extension 78 can be retained inside the hollow shaft 76 in any appropriate manner such as, but not limited, to mechanical fasteners, welding, adhesive, friction fit, etc. However, in an alternative embodiment, a snap ring 84 can retain the coupling extension 78 inside the hollow shaft 76. The snap ring 84 can be provided as any type of spring member with appropriate strength of materials and spring force to function with the alternative embodiments. The hollow shaft 76 can include an internal shoulder 88 disposed a predetermined distance further from the first end 92 than a circumferential groove 86 location when the two pieces are assembled. The snap ring 84 can be preassembled coincident with the circumferential groove 86 near the first end 92 of the coupling extension 78. When the coupling extension 78 is inserted into the hollow shaft 76, the snap ring 84 contacts the shoulder 88 and is compressed into the groove 86. Once the coupling extension 78 has been fully mounted inside the hollow shaft 76, the snap ring 84 can expand after passing the shoulder 88 in the hollow shaft 76, thereby advantageously retaining the coupling extension 78 within the hollow shaft 76.

III. Alternative Embodiments

While certain embodiments of the invention are described above, it should be understood that the disclosed subject matter can be embodied and configured in many different ways without departing from the spirit and scope of the invention. For example, separate components that can be connected directly to one another and rotate at the same speed can be integrally formed as single homogenous components. Conversely, single homogenous components can be formed as disparate elements and secured together in a manner known in the art. In the exemplary embodiment disclosed above, many of the components can be secured for rotation by splined connections. However, other torque transmitting connections known in the art can be used such as threaded fasteners, keyways and keys, welded joints, etc.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A pinion shaft assembly of a power transfer unit for transferring torque from an output gear of a transmission to a driveline structure of a vehicle, comprising:
 a hollow shaft that includes an internal splined portion;
 a pinion gear connected to a first end of the hollow shaft; and
 a coupling member that includes a flange and a coupling extension extending from the flange, the coupling extension including an external splined portion at a first end such that the coupling extension mounts coaxially within the hollow shaft, the internal splined portion of the hollow shaft meshes with the external spline portion of the coupling extension in a spline connection for coupled rotation of the hollow shaft and the coupling extension, the coupling extension includes a second end that is spaced away from the external spline portion and the second end abuts the flange, and the flange is disposed external to the hollow shaft and configured to be connected to the driveline structure.

2. The pinion shaft assembly of claim 1, wherein the pinion gear includes a first end aligned with the first end of the hollow shaft and a second end spaced inwardly of the first end of the hollow shaft, the pinion gear spans an axial length from the first end to the second end, the internal splined portion and the external splined portion terminate at the first and second ends of the pinion gear, and the coupling extension extends beyond the second end of the pinion gear.

3. The pinion shaft assembly of claim 2, wherein the coupling extension extends beyond the second end of the pinion gear by a distance that is greater than the axial length of the pinion gear.

4. The pinion shaft assembly of claim 1, wherein the coupling extension extends along a longitudinal axis, and the second end of the coupling extension can rotate about the longitudinal axis such that torsional vibrations transferred to the coupling extension are dampened.

5. The pinion shaft assembly of claim 1, further comprising:
 a shim, disposed at the first end of the hollow shaft, which retains the coupling member inside the hollow shaft,
 wherein the coupling extension is formed with a bevel that reduces a diameter of a coupling extension portion such that the shim coaxially mounts around the reduced diameter coupling extension portion.

6. The pinion shaft assembly of claim 1, further comprising:
 a circumferential groove formed on the coupling extension; and
 a snap ring that engages the circumferential groove in order to retain the coupling member inside the hollow shaft.

7. The pinion shaft assembly of claim 1, further comprising:
 a first bearing, mounted to the first end of the hollow shaft;
 a second bearing, mounted to a second end of the hollow shaft;
 a spacer, mounted to the hollow shaft; and
 a shim, mounted to the hollow shaft,
 wherein the second bearing is mounted between the spacer and the shim on the hollow shaft.

8. The pinion shaft assembly of claim 6, wherein the shim is disposed adjacent the flange, and
 wherein the spacer sets a mount location of the second bearing on the hollow shaft.

9. The pinion shaft assembly of claim 1, wherein the coupling extension includes an external piloting surface, formed as an expanding bevel around the coupling extension with an outer diameter approximate to an inner diameter of the hollow shaft such that the external piloting surface guides the hollow shaft around the coupling extension to axially align the hollow shaft and the coupling extension.

10. The pinion shaft assembly of claim 1, wherein the pinion gear is integrated with the hollow shaft to form a single member.

11. A power transfer unit for a vehicle transferring torque from an input gear of a transmission to a driveline structure of the vehicle, comprising:
 an input gear;
 a power transfer shaft connected to and driven by the input gear;
 a crown gear connected to and driven by the power transfer shaft, such that the input gear and the crown gear are fixed for rotation with the power transfer shaft; and
 a pinion shaft assembly connected to and driven by the pinion gear, the pinion shaft assembly including:
  a hollow shaft that includes an internal splined portion;
  a pinion gear connected to a first end of the hollow shaft and driven by the crown gear; and
  a coupling member that includes a flange and a coupling extension extending from the flange, the coupling extension including an external splined portion at a first end such that the coupling extension mounts coaxially within the hollow shaft, the internal splined portion of the hollow shaft meshes with the external spline portion of the coupling extension in a spline connection for coupled rotation of the hollow shaft and the coupling extension, the coupling extension includes a second end that is spaced away from the external spline portion and the second end abuts the flange, and the flange is disposed external to the hollow shaft and configured to be connected to the driveline structure.

12. The power transfer unit of claim 11, further comprising:
 a power transfer gear; and
 an input member connected to and driven by the power transfer gear.

13. The power transfer unit of claim 12, wherein the input member is a vehicle differential assembly.

14. The power transfer unit of claim 11, wherein the pinion gear includes a first end aligned with the first end of the hollow shaft and a second end spaced inwardly of the first end of the hollow shaft, the pinion gear spans an axial length from the first end to the second end, the internal splined portion and the external splined portion terminate at the first and second ends of the pinion gear, and the coupling extension extends beyond the second end of the pinion gear.

15. The power transfer unit of claim 14, wherein the coupling extension extends beyond the second end of the pinion gear by a distance that is greater than the axial length of the pinion gear.

16. The pinion shaft assembly of claim 11, wherein the coupling extension extends along a longitudinal axis, and the second end of the coupling extension can rotate about the longitudinal axis such that torsional vibrations transferred to the coupling extension are dampened.

17. The power transfer unit of claim 11, further comprising:
- a shim, disposed at the first end of the hollow shaft, which retains the coupling member inside the hollow shaft,
- wherein the coupling extension is formed with a bevel that reduces a diameter of a coupling extension portion such that the shim coaxially mounts around the reduced diameter coupling extension portion.

18. The power transfer unit of claim 11, further comprising:
- a circumferential groove formed on the coupling extension; and
- a snap ring that engages the circumferential groove in order to retain the coupling member inside the hollow shaft.

19. The power transfer unit of claim 11, further comprising:
- a first bearing, mounted to the first end of the hollow shaft;
- a second bearing, mounted to a second end of the hollow shaft;
- a spacer, mounted to the hollow shaft; and
- a shim, mounted to the hollow shaft, such that the shim abuts the flange,
- wherein the second bearing is mounted between the spacer and the shim on the hollow shaft, and
- wherein the coupling extension includes an external piloting surface formed as an expanding bevel around the coupling extension with an outer diameter approximate to an inner diameter of the hollow shaft such that the external piloting surface guides the hollow shaft around the coupling extension to axially align the hollow shaft and the coupling extension.

20. A method for transferring torque from an output gear of a transmission to a driveline structure of a vehicle, comprising:
- splining an internal portion of a hollow shaft;
- connecting a pinion gear to a first end of the hollow shaft;
- splining an external portion of a first end of a coupling extension of a coupling member that includes a flange at a second end;
- coaxially mounting the extension member within the hollow shaft;
- meshing the external portion with the internal splined portion in a spline connection for coupled rotation of the hollow shaft and the coupling extension; and
- configuring the flange to be connected to the driveline structure of the vehicle, wherein
- the pinion gear includes a first end aligned with the first end of the hollow shaft and a second end spaced inwardly of the first end of the hollow shaft, the pinion gear spans an axial length from the first end to the second end, and
- the internal portion and the external portion are splined and meshed such that the internal splined portion and the external splined portion terminate at the first and second ends of the pinion gear, and the coupling extension extends beyond the second end of the pinion gear.

* * * * *